United States Patent [19]

Gnyra

[11] Patent Number: 4,681,819
[45] Date of Patent: Jul. 21, 1987

[54] TREATMENT OF REFRACTORY ARTICLES

[75] Inventor: Bohdan Gnyra, Kingston, Canada

[73] Assignee: Alcan International Limited, Montreal, Canada

[21] Appl. No.: 618,995

[22] Filed: Jun. 11, 1984

[51] Int. Cl.$^4$ ................................................ B32B 9/60
[52] U.S. Cl. ..................................... 428/697; 427/226; 427/419.2; 427/419.7; 428/697; 428/699
[58] Field of Search ................ 427/226, 190, 203–205, 427/419.7, 419.2; 428/689, 696, 697, 699, 704; 423/331, 341

[56] References Cited

U.S. PATENT DOCUMENTS

| | | | |
|---|---|---|---|
| 2,584,894 | 2/1952 | MacIntire | 423/341 |
| 2,991,191 | 7/1961 | Montgomery et al. | 427/190 |
| 3,102,044 | 8/1963 | Joseph | 427/190 |
| 3,535,154 | 10/1970 | Meyer-Simon et al. | 427/226 |
| 3,962,492 | 6/1976 | Phelps | 427/204 |
| 4,492,721 | 1/1985 | Joosten et al. | 427/226 |

Primary Examiner—Norman Morgenstern
Assistant Examiner—Janyce A. Bell
Attorney, Agent, or Firm—Cooper, Dunham, Griffin & Moran

[57] ABSTRACT

A method of treating formed refractory articles for protection against attack by molten aluminum metal, including the steps of impregnating surface portions of the formed articles with an aqueous solution of magnesium fluosilicate and heating to decompose the magnesium fluosilicate for producing, in situ, fluoride values that inhibit wetting of the treated surfaces by the molten metal. Colliodal alumina may be incorporated in the impregnating solution. A silicate coating may be applied over the impregnated surface portions; in such case, the coating when dried is itself impregnated with a further application of magnesium fluosilicate solution. The treated articles have anti-wetting fluoride values on or in their surface portions and exhibit enhanced resistance to attack by molten aluminum.

35 Claims, No Drawings

TREATMENT OF REFRACTORY ARTICLES

BACKGROUND OF THE INVENTION

This invention relates to methods of preparing refractory articles for use in contact with molten aluminum metal, and to the articles thus produced. More particularly, it is directed to treatments for enhancing the resistance of refractory articles to attack by molten aluminum metal. The term "aluminum metal" as used herein embraces aluminum containing contaminants and impurities, and aluminum-based alloys, as well as pure elemental aluminum.

In casting, holding, transporting, and other operations involving the handling and treating of molten aluminum metal, it is customary to employ articles constituted of refractories for contact with the molten metal. Examples of such articles are the diptubes, floats, and hot-tops often used in direct chill casting procedures; trough linings, channels and pipes for conducting the molten metal; and linings of crucibles and holding vessels. These refractory articles serve to provide insulation, containment of the molten metal without deteriorating under severe thermal and chemical conditions, and protection of surrounding support structures. High strength, low thermal conductivity, low cost, appropriate density for the specific intended use, and good resistance to chemical attack by molten aluminum metal are important criteria in the selection of refractories for the foregoing and other aluminum-handling purposes. A wide variety of refractory materials have been used to form articles for contact with molten aluminum, including fibrous (e.g. board-type) and nonfibrous (e.g. dense, castable, brick-type) refractories, of diverse densities, porosities, and compositions; oxides such as alumina, silica, calcium silicate, and aluminum silicate are among the more frequently employed composition ingredients. Refractory articles as herein contemplated are commonly formed, from an initially wet refractory composition capable of being shaped as by casting, pressing, or trowelling, either in situ (in the case of linings), or in molds, presses, or other equipment, and are set and calcined or at least thoroughly dried before use.

The provision of refractory articles having satisfactory resistance to attack by molten aluminum metal together with a useful combination of other desired properties and attributes, including relatively low cost, has been a continuing problem for the aluminum industry. Most of the commonly used refractories contain $SiO_2$ (usually in the form of a silicate), with which molten aluminum reacts chemically. Alloys containing Mg are notably aggressive toward refractories; for instance, the alloy having the Aluminum Association designation AA 5182, containing 4.5% Mg, attacks refractories particularly strongly. Examples of reactions involved in Al-Mg alloy attack on refractory materials are as follows:

$$4Al + 3SiO_2 \rightarrow 2\alpha - Al_2O_3 + 3Si$$

$$2 Mg + SiO_2 \rightarrow 2MgO + Si$$

$$3 Mg + Al_2O_3 \rightarrow 3MgO + 2Al$$

$$MgO + Al_2O_3 \rightarrow MgO \cdot Al_2O_3 \text{ (spinel)}.$$

Aluminum metal containing Li (even in usual trace amounts) tends to be even more aggressive toward refractories, because of the highly reactive nature of Li.

It has heretofore been proposed to enhance the resistance of refractory articles to molten aluminum metal attack by incorporating, in a refractory composition (i.e. before forming the articles therefrom) an additive compound that will reduce wetting or attack of the final formed article by the molten metal. These additives, however, may adversely affect other desired properties such as strength, and sometimes require the exercise of special care in formulating or handling the compositions in which they are used.

SUMMARY OF THE INVENTION

The present invention, in a first aspect, contemplates the provision of a method of treating a formed refractory article for use in contact with molten aluminum metal, to protect, against attack by the molten metal, a surface portion of the article arranged for exposure to the molten metal in use. In this aspect, the method of the invention broadly comprises the steps of impregnating the aforementioned surface portion of the formed refractory article with an aqueous solution of magnesium fluosilicate for establishing thereon a magnesium fluosilicate deposit capable of providing, upon thermal decomposition, fluoride values of a type and in an amount effective to enhance the resistance of the surface portion to attack by molten aluminum metal; and thereafter heating at least the impregnated surface portion to decompose the deposited magnesium fluosilicate therein for producing, in situ, the aforesaid fluoride values.

As used herein, the term "magnesium fluosilicate" embraces $MgSiF_6 \cdot 6H_2O$ as well as anhydrous $MgSiF_6$. The term "surface portion" above refers to whatever part or parts of the surface or surfaces of the article are arranged for exposure to molten metal, together with surface-adjacent regions of the article that are impregnable with aqueous solutions applied to the surface. The term "formed article" designates an article already formed into substantially its final shape for use, and set (prior to impregnation with the magnesium fluosilicate solution), as by casting, pressing or otherwise forming a refractory material. All proportions, percentages, and parts herein are expressed as proportions, percentages and parts by weight unless otherwise specifically stated.

More particularly, the impregnating solution is an aqueous solution of $MgSiF_6 \cdot 6H_2O$. The impregnated surface portion of the article is dried to remove free water of the impregnating solution, and also preferably moderately heated to dehydrate the deposited $MgSiF_6 \cdot 6H_2O$, before being heated to a temperature for decomposition of the magnesium fluosilicate. For at least many applications, it is currently preferred that the concentration of magnesium fluosilicate (expressed as $MgSiF_6 \cdot 6H_2O$) in the aqueous solution be in a range of about 100 to about 500 grams per liter (g/l), and that the amount of magnesium fluosilicate deposited on the impregnated surface portion of the article be in a range of about 1.0 to about 25 grams of $MgSiF_6 \cdot 6H_2O$ per 100 $cm^2$ of surface area.

It is also preferred that the decomposition step be performed by heating at least the impregnated surface portion (or the entire refractory article) to a temperature of about 300° to about 500° C. before bringing the article into contact with molten metal. However, it is possible to effect decomposition simply by the heating which occurs upon bringing the impregnated surface portion of the article into contact with molten aluminum metal, i.e. during the initial use of the article.

The fluoride values (ordinarily or typically comprising, at least principally, the decomposition product $MgF_2$) established by the method of the invention on the treated surface portion of a formed refractory article exhibit "anti-wetting" properties that afford very effective protection of the article against attack by molten aluminum metal, including Li-containing and Mg-containing melts that are highly aggressive to untreated refractories. The method may be employed to treat refractory articles constituted of a wide variety of refractory materials, e.g. materials comprising at least one oxide selected from the class consisting of alumina, silica, aluminum silicate, and calcium silicate. For instance, the treated article may be a pressed body of a fibrous refractory or a cast body of a nonfibrous, castable refractory. Especially superior results are achieved in treatment of articles formed of refractory materials comprising aluminum silicate.

The solution employed in the impregnating step is preferably prepared by dissolving crystalline $MgSiF_6 \cdot 6H_2O$ in water, but may also be prepared by adding MgO and HF to a dilute aqueous solution of $H_2SiF_6$ for reaction to produce magnesium fluosilicate. In some instances, especially if the solution is acidic or if the surface portion to be impregnated is relatively porous, an aqueous dispersion of colloidal alumina is advantageously incorporated in the solution before impregnation; in such case, colloidal alumina is deposited along with the magnesium fluosilicate on the impregnated surface portion of the treated article. The colloidal alumina beneficially modifies an acid solution and enhances the smoothness of a porous surface portion; for the latter purpose, the dispersion of colloidal alumina is incorporated in the solution in a proportion effective to reduce the porosity of the surface portion by at least partially filling pores thereof with deposited colloidal alumina. Conveniently or preferably, incorporation of colloidal alumina in the solution is effected by mixing, with a major proportion of the aqueous solution of magnesium fluosilicate, a minor proportion of a dispersion of colloidal alumina which contains about 5% to about 10% solids. In currently preferred formulations, the amount of colloidal alumina thus incorporated in the solution may range up to about 15% (dry basis).

Further in accordance with the invention, in particular embodiments thereof, the treatment of a formed refractory article includes the additional steps of applying to the surface portion of the article (after initial impregnation with a magnesium fluosilicate solution as described above) a layer of a coating comprising a silicate selected from the class consisting of aluminum silicate and calcium silicate in mixture with a binder, and, when the layer is dry, impregnating the layer with an aqueous solution of magnesium fluosilicate. These steps may be performed before the step of heating the article (or at least its treated surface portions) to decompose magnesium fluosilicate. The treatment in these embodiments may also include the step of calcining the applied coating layer. In any event, after the final impregnation (of the coating layer) with magnesium fluosilicate solution, the article is heated, either before or incident to its initial use in contact with molten aluminum metal, sufficiently to decompose the magnesium fluosilicate deposited on the coating for producing anti-wetting fluoride values.

In the coating, the silicate is preferably aluminum silicate, most preferably in the form of minute needles produced by milling fibrous fused aluminum silicate; and the coating composition consists essentially of a powder mixture comprising a major proportion of the silicate and a minor proportion of kaolin, and a binder, e.g. a dispersion of colloidal silica. The powder mixture may additionally include a minor proportion of $\alpha - Al_2O_3$ powder and/or a minor proportion of $BaSO_4$ powder. It is currently preferred that the impregnation of the applied and dried coating layer be performed by applying to the layer a quantity of solution for depositing on the layer an amount of magnesium fluosilicate equal to that deposited by applying to the layer about 10 to about 20 cc per 100 $cm^2$ of surface area of an aqueous solution of $MgSiF_6 \cdot 6H_2O$ at a concentration of 200 grams per liter. A currently preferred range of thicknesses for the dried coating layer is about 0.1 to about 3 mm.

In still further embodiments of the method of the invention, a coating composition consisting essentially of the aforementioned powder mixture and a small proportion of binder slurry, having an initially putty-like consistency, may be used to make patches, fill cracks, bond refractory pieces together, or otherwise constitute (when dried) a formed refractory article which is then subjected, in accordance with the invention, to surface impregnation with magnesium fluosilicate solution and heating to decompose the $MgSiF_6$.

The invention also embraces formed refractory articles treated in accordance with any of the various embodiments of the above-described method. These articles are characterized by the presence, in their treated surface portions, of anti-wetting fluoride values established by deposition and decomposition of magnesium fluosilicate, affording enhanced resistance to attack by molten aluminum metal.

In a broader aspect, the invention embraces a method of protecting a formed refractory article from attack by molten aluminum metal comprising depositing magnesium fluosilicate on a surface portion of the formed article exposed for contact with molten metal and heating at least that surface portion for decomposing the deposited magnesium fluosilicate to produce, in situ, fluoride values effective to enhance the resistance of the treated surface portion to attack by molten aluminum metal. The depositing step may include depositing colloidal alumina together with magnesium fluosilicate on the aforementioned surface portion. The method in this broad sense may also include the steps of applying to the surface portion, after the depositing step, a layer of an initially fluent coating comprising a silicate selected from the class consisting of aluminum silicate and calcium silicate, and, after the coating layer has dried, depositing magnesium fluosilicate thereon.

In yet another aspect, the invention contemplates a method of treating a formed refractory article for use in contact with molten aluminum metal comprising establishing, on a surface portion of the formed article which is arranged for exposure to molten metal in use, fluoride values comprising $MgF_2$ in an amount effective to enhance the resistance of the treated surface portion to attack by molten aluminum metal.

The present invention, in its various aspects and embodiments, provides formed refractory articles of many diverse types which, by virtue of the protective, anti-wetting fluoride values formed in situ on or in their treated surface portions, resist attack even by aggressive (e.g. Li- and/or Mg-containing) aluminum melts, and in consequence have advantageously increased useful service lives, as compared with otherwise identical articles not treated in accordance with the invention. In particular, the treatments of the invention greatly reduce or retard development of the deleterious heavy, adherent skulls which form on the surface portions of untreated refractory articles exposed to such aggressive melts. The treatments including deposition of colloidal alumina or application of a silicate coating layer, by filling pores of the treated surface portions and smoothing surface roughness, afford the additional benefit of eliminating sites at which skulls can become mechanically attached or keyed to the articles; hence such skulls as do form can readily be removed. These treatments, in many cases, also contribute to the strength of the articles. It is especially advantageous that the foregoing results are achieved by simple surface applications (typically or frequently with a degree of impregnation below the surface) on already-formed articles, rather than by the use of special or modified refractory compositions (which sometimes detract from desired physical and/or chemical properties) to form the article; thus, existing or other wholly conventional refractory articles can be beneficially protected by the present method.

Further features and advantages of the invention will be apparent from the detailed description hereinbelow set forth.

DETAILED DESCRIPTION

The invention will be described as embodied in methods of treating formed refractory articles for use in contact with molten aluminum metal, and in the treated articles. By way of example, the invention can be applied to the treatment of a great variety of conventional formed refractory shapes employed in casting, holding, transporting, delivering, or otherwise handling or treating molten aluminum metal, including, without limitation, trough, channel, and vessel linings, bricks, tiles, hot tops, dip tubes, floats and pipes. These articles may be constituted of fibrous refractories (e.g. in the form of boards or rigidized felts) or nonfibrous refractories (e.g. dense, brick-type refractories), and may be of high, intermediate or low porosity or density. Illustrative materials of which articles treated by the present method can be made are, again without limitation, calcium silicate (e.g. wollastonite) boards and various shapes fabricated therefrom; aluminum silicate fibers or powders rigidized with colloidal silica; high-alumina castables (containing above 80% $Al_2O_3$) as well as low-alumina castables and bricks; fused silica castables (containing above 90% $SiO_2$); and graphitized clays as used for crucibles. Stated somewhat more generally, among compositions suitable for the fabrication of articles treatable by the present method are refractories comprising or containing substantial amounts of one or more oxides, e.g. alumina, aluminum silicate, and calcium silicate.

Before being subjected to treatment by the present method, the refractory article to be treated is typically or ordinarily already formed into its final shape and dimensions for use in a molten metal treating or handling operation. The fabrication of such formed articles, as well as the compositions of which they are made, may as stated be wholly conventional, and accordingly need not be further described.

In exemplary embodiments of the method of the invention, a formed refractory article as referred to above is treated, to protect it from attack by molten aluminum metal, by impregnating the surface or surfaces of the article that will be exposed to the molten metal with an aqueous solution of $MgSiF_6 \cdot 6H_2O$, and thereafter heating at least the impregnated portion or portions of the article to decompose the $MgSiF_6$ for producing, at and adjacent the impregnated surfaces, anti-wetting or protective fluoride values which inhibit chemical attack on the article by the molten metal. The quantity of magnesium fluosilicate applied per unit surface area is selected to provide, upon decomposition, an amount of protective fluoride values effective to enhance the resistance of the treated surfaces to attack by molten aluminum.

The decomposition of $MgSiF_6$ may be represented by the reaction $$MgSiF_6 \rightarrow MgF_2 + SiF_4 \qquad (1)$$

and the protective fluoride values thus obtained composition or include the decomposition product $MgF_2$. In some cases other or additional protective fluoride values may be produced as a result of the decomposition reaction, e.g. by reaction of the decomposition product $SiF_4$ with one or more compounds of the refractory substrate; for instance, when the article being treated is made of a calcium silicate such as wollastonite, the protective fluoride values obtained as a result of the decomposition reaction may include $CaF_2$ as well as $MgF_2$. Again, in treating an article fabricated of a fibrous aluminum silicate, the produced protective fluoride values may include quantities of a highly refractory topaz, $Al_2SiO_4(F,OH)_2$, along with the $MgF_2$. It is at present believed, however, that the $MgF_2$ is the principal protective fluoride value obtained.

Conveniently, the solution employed to impregnate the surface or surfaces of the formed article is prepared by simply dissolving, in a suitable volume of water, crystalline $MgSiF_6 \cdot 6H_2O$, which is a currently available chemical of commerce. For example, in a currently preferred formulation (herein termed "Formulation I"), 400 g. of crystalline $MgSiF_6 \cdot 6H_2O$ may be mixed and dissolved in 2 liters of water to provide a solution having a magnesium fluosilicate concentration of 200 g/l. At such concentrations, the solution is typically applied to a surface of a formed refractory article to be treated in an amount of about 25 cc per 100 cm² of surface area, although lesser amounts may be applied to surfaces of heavily rigidized boards, bricks or dense castables, and larger amounts (e.g. up to 30 to 50 cc per 100 cm² of surface area) may be applied to surfaces of relatively highly porous, mildly rigidized boards.

The $MgSiF_6 \cdot 6H_2O$ solution may alternatively be prepared from $H_2SiF_6$ and MgO. In one illustrative procedure for producing 200 cc of $MgSiF_6 \cdot 6H_2O$ solution (Formulation II), 26.5 parts of silica gel (about 10% water) dispersed in 150 parts of water and mixed with 108 parts of a 48% HF solution are employed to obtain $H_2SiF_6$ in accordance with the reaction

$$SiO_2 + 6HF \rightarrow H_2SiF_6 + 2H_2O \quad (2)$$

and 16 parts of MgO powder are then added to obtain the $MgSiF_6 \cdot 6H_2O$, viz.:

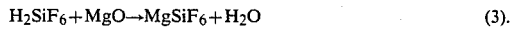

$$H_2SiF_6 + MgO \rightarrow MgSiF_6 + H_2O \quad (3).$$

At the resultant concentration, application of 10 cc. of the produced $MgSiF_6 \cdot 6H_2O$ solution to 100 cm² of refractory article surface area corresponds to 1.2 g of $MgF_2$ per 100 cm² of surface area; application of 15 cc of the solution to 100 cm² of surface area corresponds to 1.8 g of $MgF_2$ per 100 cm² of surface area.

In a still further example (representing present preference when the $MgSiF_6 \cdot 6H_2O$ solution is prepared from $H_2SiF_6$ and MgO), 57 g. of fine MgO powder are added slowly, with vigorous stirring, to 760 cc. of a 25% $H_2SiF_6$ solution which has been preheated to 70° C. and thereafter 10 cc of a 48% HF solution are added, followed by stirring at a temperature near the boiling point for a further 30 minutes. The resultant $MgSiF_6 \cdot 6H_2O$ solution (Formulation III) may be used at the produced concentration or diluted, before application, with up to twice its volume of water. For instance, the produced $MgSiF_6 \cdot 6H_2O$ solution of Formulation III, diluted with 760 cc. of water (Formulation IV), may be applied to a formed refractory article surface in an amount of e.g. about 25 cc. per 100 cm² of surface area (or less, or more, depending on surface porosity).

It will be seen from the foregoing examples that the concentration of the aqueous solution of $MgSiF_6 \cdot 6H_2O$ may vary widely; concentrations as low as 200 g/l (or less) and at least as high as 400 g/l have been employed successfully, a currently preferred broad range being about 100 to about 500 g/l. Stated in general, more dilute solutions may be employed for complete, deep penetration, e.g. of very porous surfaces, and more concentrated solutions for treatment substantially only at the surface of a less porous article. However, it is sometimes advantageous to use a highly concentrated solution for rapid application to a small surface area of a very porous article, where it is desired to achieve an adequate deposit of $MgSiF_6$ while restricting the area of application; if a dilute solution were used, the wicking effect of the porous refractory would extend the area of impregnation beyond what is desired before the region to be protected received the requisite deposit. The amount of solution applied per unit area may also be varied quite widely, depending of course on the concentration of the solution as well as on the porosity of the surface. Exemplary amounts of deposited $MgSiF_6$ per unit surface area, expressed as equivalent $MgF_2$, range from 1.2 g to 4 g per 100 cm² of surface area. A currently preferred broad range, expressed as $MgSiF_6 \cdot 6H_2O$, is about 1.0 to about 25 g per 100 cm² of surface area. These and the other values of concentration and amounts of deposited $MgSiF_6$ per unit area set forth above are merely illustrative and the invention in its broadest aspects is not limited thereto.

As a further particular feature of the invention, in specific embodiments thereof, a quantity of colloidal alumina may be incorporated in the magnesium fluosilicate solution before application to a refractory article surface. A preferred upper limit for the added colloidal alumina is about 15 grams (dry basis) per liter of solution. A suitable alumina material for this purpose is the product commercially available under the trade name "Dispural," a fine white powder of alumina monohydrate which forms a stable colloidal aqueous dispersion (5-10% solids) in dilute acids such as hydrochloric, acetic, and monochloroacetic acids; this product is manufactured by Condea Co., Federal Republic of Germany, and is obtainable in the United States through Remet Corporation, Chadwicks, N.Y. To prepare a standard aqueous suspension of colloidal alumina with "Dispural" powder, 90 g. of the "Dispural" powder and 10 cc of concentrated hydrochloric acid are mixed in 760 cc of water for 45 minutes and allowed to settle overnight, after which the bottom sediment is removed and discarded. Illustrative but again non-limiting formulations of magnesium fluosilicate solutions containing dispersed colloidal alumina, suitable for use in the practice of the present method, are as follows:

Formulation I-A—Add to Formulation I (400 g. of $MgSiF_6 6H_2O$ dissolved in two liters of water) 200 ml of a standard aqueous suspension of "Dispural" powder prepared as described above, and mix energetically for 10 to 20 minutes.

Formulation III-A—Add 0.4 parts of 36% HCl and 2.2 to 4.5 parts (depending on the porosity of the refractory article surface to be treated) of "Dispural" powder to 76 parts of vigorously agitated water, and continue stirring for 30 to 60 minutes. Mix the produced colloidal suspension with an equal amount of Formulation III ($MgSiF_6 \cdot 6H_2O$ solution prepared with 57 g of MgO, 10 cc. of 48% HF, and 760 cc of 25% $H_2SiF_6$ solution).

Formulation IV-A—Dilute 200 cc of the above-described standard aqueous suspension of "Dispural" powder with 560 cc. of water, and mix with Formulation IV (Formulation III diluted with 760 cc of water). Formulations I-A and IV-A are currently especially preferred.

For a given concentration, a greater amount (per unit area) of the solution is applied to a surface of a formed refractory article which is very porous (e.g. an article fabricated of wollanstonite) than is used for a very dense refractory such as fused silica or alumina castable. In the latter case, it is wasteful to apply more solution than the relatively nonporous refractory surface can absorb, while the more porous refractories are able to absorb larger amounts of solution (with resultant enhanced depth of protection) and also, being generally less strong than denser refractories, benefit from the strengthening effect imparted by the increased amounts of solution. The aforementioned values of about 25 cc of solution per 100 cm$^2$ of surface area for refractories of "normal" density (e.g. medium-rigidized articles of "Fiberfrax" refractory), somewhat less for heavily rigidized boards, bricks, and dense castables, and up to 30–50 cc/100 cm$^2$ for relatively highly porous articles (such as mildly rigidized boards), represent currently preferred practice for applications of the preferred Formulations I-A, IV-A, I and IV, i.e. having a magnesium fluosilicate concentration of about 200 g/l with or without colloidal alumina present in the indicated proportions.

The colloidal alumina, when present, serves as a pore-filler and also acts to modify an otherwise strongly acidic solution. This latter function is important when the magnesium fluosilicate solution is prepared H$_2$SiF$_6$ and MgO, in the presence of acid; hence, in such case the addition of colloidal alumina to the solution is very strongly preferred. On the other hand, when the solution is prepared (as now preferred) by simply dissolving commercially available crystalline MgSiF$_6$·6H$_2$O in water, there is no need for the acidity-modifying effect of the alumina, and accordingly the alumina may be omitted except for applications where its pore-filling function is desired. In particular, the colloidal alumina is very preferably not included in solutions prepared (by dissolving crystalline MgSiF$_6$·6H$_2$O) for application to dense high alumina or fused silica castables, because in these instances its presence seriously hinders penetration of the refractory article surfaces by the magnesium fluosilicate solution. It is, however, advantageously incorporated in solutions applied to more porous refractory articles, to fill the pores and thereby aid in imparting a smooth surface to the articles. An important benefit of filling pores is to minimize the mechanical attachment or keying of deposits ("skulls") that develop on the refractory surfaces in contact with molten metal.

In the practice of the present method, impregnation of the surfaces of a formed refractory article with an aqueous solution of magnesium fluosilicate as described above (with or without colloidal alumina present) is typically, and in many instances preferably, performed by brushing the solution onto the surfaces to be treated, until the desired amount per unit area has been applied. Other application techniques that may be employed include spraying and dipping; whatever the technique used, the objective is to achieve a controlled, substantially uniform application with full coverage of the treated surface. The applied solution not only overlies the article surface but also is absorbed into pores in the surface-adjacent regions of the article, i.e. insofar as the article is porous; and the colloidal alumina, if present, more or less fills the pores. The depth of penetration below the treated surface is determined by such factors as the porosity of the substrate (article) and the amount of solution applied per unit surface area. Only those surfaces of the refractory article which will be exposed to (and are thus subject to wetting by) molten aluminum metal in use need be impregnated with the solution.

After impregnation, the treated surfaces of the refractory article must be dried to remove the free water of the solution. Drying may be effected by allowing the article simply to stand at room temperature for a sufficient period (e.g. overnight), or by heating, e.g. for several hours at 100° C. The impregnation and drying operations establish, on the treated surfaces (and in the surface-adjacent regions) of the article, a deposit of magnesium fluosilicate, which at this point is still in the hydrate form (MgSiF$_6$·6H$_2$O).

Preferably, before any further steps are performed, the article is heated to dehydrate the deposited magnesium fluosilicate, i.e. to convert it to anhydrous MgSiF$_6$. Heating to about 200° C. is effective to accomplish the dehydration. For reasons of safety, it is especially important to effect dehydration where the treated surfaces are within a closed system such as a pipe.

The article (or at least its impregnated surfaces and surface-adjacent regions) may then be heated sufficiently to decompose the deposited MgSiF$_6$ and, thereby, to produce anti-wetting or protective fluoride values in situ at and adjacent the treated surfaces, viz. fluoride values which inhibit wetting or attack of the refractory by molten aluminum metal. This step is preferably performed as a controlled heating operation, with elevation of article temperature to about 300° to about 500° C., although it is also possible to employ the initial actual use of the treated article (i.e. use in contact with molten metal) to effect the decomposition, since contact of the treated surfaces with molten aluminum metal will heat the surfaces and adjacent regions of the article to a temperature at which decomposition of MgSiF$_6$ occurs.

The product of the described method is a formed refractory article for use in contact with molten aluminum metal, having its metal-contacting surfaces and, to some extent, the subjacent regions of the article, protected (against molten metal attack) by anti-wetting fluoride values formed in situ as a result of decomposition of deposited MgSiF$_6$. It is found that, owing to this protection of their surface regions (where attack by molten metal begins), the thus-treated articles exhibit greatly enhanced resistance to attack by molten aluminum metal as compared to untreated but otherwise identical articles. In particular, the treated articles remain virtually unimpaired after prolonged periods of contact with molten metal that is ordinarily aggressive toward refractories, e.g. aluminum containing lithium and aluminum alloys containing 4.5% magnesium. Such skulls as do form on the articles upon exposure to the molten metal are light and easily removable rather than being heavy and strongly adherent (mechanically keyed) to the article surfaces as is the case with untreated articles. These beneficial results are achieved by an economical and simple surface treatment which can be applied to already-formed, conventional refractory articles of a wide variety of compositions.

While the foregoing surface treatment of a formed refractory article (by impregnation with an aqueous solution of $MgSiF_6 \cdot 6H_2O$, with or without colloidal alumina present, and heating to decompose the $MgSiF_6$) in itself affords highly effective protection of the article against attack even by aggressive Li- or Mg-containing aluminum melts, still greater protection can be attained in many instances, in accordance with the invention, by applying a silicate coating to the magnesium fluosilicate-impregnated surfaces of the article and thereafter impregnating the coating with a further application of a magnesium fluosilicate solution, followed by heating to decompose the $MgSiF_6$.

The silicate coating used in these embodiments of the method of the invention comprises a major proportion of finely divided aluminum silicate or calcium silicate, a minor proportion of kaolin ($Al_2O_3 \cdot 2SiO_2 \cdot 2H_2O$) such as (for example) refined white Georgia clay of a low iron content, and a binder (e.g. colloidal silica), with or without minor amounts of finely divided $\alpha\text{-}Al_2O_3$ and/or $BaSO_4$. The silicate is preferably aluminum silicate, it having been found that the magnesium fluosilicate treatment of the invention affords most effective protection against molten aluminum attack when applied to aluminum silicate. Most preferably, the aluminum silicate used is a fibrous fused aluminum silicate ground to the form of minute needles about 10 microns long and about one to two microns thick. Such needles can be produced, for example, by milling the fused aluminum silicate commercially available under the trade name "Fiberfrax" (Carborundum Co.).

In a currently preferred formulation, the coating is prepared from the powder mixture set forth in the following table:

|  | Example | Range |
|---|---|---|
| milled "Fiberfrax" powder (aluminum silicate) | 760 parts | 600–900 parts |
| kaolin | 60 parts | 30–90 parts |
| milled $\alpha\text{-}Al_2O_3$ powder | 120 parts | 0–200 parts |
| fine $BaSO_4$ powder | 80 parts | 0–100 parts |

This powder mixture is slurried in a colloidal silica rigidizer first diluted with tap water to constitute the coating composition. A suitable colloidal silica rigidizer is the product commercially available under the trade name "Kaowool Rigidizer" (Babcock & Wilcox Co.), which is an aqueous dispersion of negatively charged silica particles (sols) comprising 40% silica solids (when calcined at 600° C. for one hour), and used commonly as a bonding agent for various inorganic fibers, notably for aluminum silicate fibers. Typically, before addition of the above-described powder mixture, the initial colloidal silica dispersion (i.e. in as-purchased concentration) is diluted with an equal volume of tap water, although other dilutions (e.g. 75% initial colloidal silica dispersion, 25% water) may be employed in particular instances.

In an illustrative specific coating formulation for use in the method of the invention, 100 g. of the powder mixture set forth under the heading "Example" in the above table are slurried in 60 cc. of a 50/50 water-diluted "Kaowool Rigidizer" dispersion (one part water, one part initial colloidal silica dispersion) (Formulation V). For application to relatively highly porous refractory surfaces, the proportion of powder mixture used is reduced (e.g. 100 g. of the "Example" powder mixture slurried in 80 to 100 cc. of the 50/50 water diluted "Kaowool Rigidizer" dispersion)(Formulation VI). Reduced dilution of the initial colloidal silica dispersion with water (say, 75/25 rather than 50/50) lowers somewhat the protection of the coating against wetting of the coated refractory article by molten aluminum but increases the added strength imparted to the article by the coating. A range of about 50/50 to about 75/25 is currently preferred for the ratio of undiluted rigidizer (initial colloidal silica dispersion) to diluting water, although even undiluted rigidizer can be used.

Although $\alpha\text{-}Al_2O_3$ and $BaSO_4$ are optional ingredients of the above-described powder, it is generally preferred to have both present, especially for application to articles such as diptubes and floats, to impart smooth, shiny surfaces to the coated articles. Where high surface smoothness is not required, they may be omitted.

In some instances, a fine calcium silicate (e.g. wollastonite) powder can be substituted for the aluminum silicate content of the above powder mixture; thus, in the "Example" powder mixture of the table, the 760 parts of "Fiberfrax" powder could be replaced by 760 parts of wollastonite powder, with the other ingredients unchanged. The coating formulations using wollastonite powder are less durable, less strongly adherent, and less resistant to attack by aluminum alloys containing 4.5% magnesium, and exhibit increased susceptibility to cracking when applied to surfaces of nonrigidized porous insulating refractories, as compared with coatings using "Fiberfrax" or like aluminum silicate powder, but are also less expensive because wollastonite costs less than the aluminum silicate, and they are acceptable for various less demanding applications.

The first step of the method of the invention, in embodiments employing a silicate coating, is the impregnation of a surface or surfaces of a formed refractory article (viz. an article for use in contact with molten aluminum metal) with an aqueous solution of $MgSiF_6 \cdot 6H_2O$. This impregnation step may be performed in the manner already described, preferably using the above-mentioned "Formulation I" (crystalline $MgSiF_6 \cdot 6H_2O$ dissolved in water), without colloidal alumina present, since the alumina is not needed to modify the acidity of this solution and is not required to fill surface pores where a silicate coating is subsequently applied. The amount of solution applied may be the same as in cases where no subsequent coating is used, e.g. about 25 cc. per 100 cm² of surface area (at a magnesium fluosilicate concentration of 200 g/l ) or more or less, depending on substrate (refractory surface) porosity. The impregnated surfaces must be thoroughly dried, as by heating to 100° C. or standing at room temperature overnight, before application of the silicate coating. Also, if the article treated is an overrigidized refractory article, any surface deposits of silica (resulting from the overrigidizing treatment) should be removed by brushing.

The silicate coating, which is a relatively thin slurry, is now applied (most preferably by brushing) to the magnesium fluosilicate-impregnated surfaces of the article, to establish thereon a thin, continuous coating layer extending over the entire surface area to be protected. This applied coating is dried, as by heating to 100°–200° C. or allowing the coated article to stand at room temperature overnight. Preferably the dried coating is about 0.1 to about 3 mm. thick.

The surface of the dried coating is next impregnated with a further application of an aqueous magnesium fluosilicate solution, again preferably the "Formulation I" solution without colloidal alumina, but at a typically somewhat lighter level of application (e.g. 10–20 cc./100 cm² of surface area, with a solution concentration of 200 g/l ) than is used for the initial impregnation of the uncoated article surface. The solution-impregnated coating is again dried, for example by heating to about 200° C. for about two hours.

The silicate coating may be calcined by heating the article up to 500° C., and/or the magnesium fluosilicate applied both before and after the silicate-coating step may be decomposed by heating the article e.g. to 300°–500° C. after the final, post-coating impregnation, or alternatively the decomposition may be effected by the heating that occurs from contact with molten metal when the treated article is placed in service; in any event, as in the embodiments of the invention already described, the MgSiF present both on and beneath the coating is decomposed by heat to form, in situ, anti-wetting or protective fluoride values (believed to be principally $MgF_2$) effective to inhibit attack on the article by molten aluminum metal.

The product of this procedure is a formed refractory article having, in one or more surface regions, protective fluoride values and bearing, on those surfaces, a continuous silicate coating which itself carries protective fluoride values resulting from the second magnesium fluosilicate impregnation step. This coating is strongly adherent to the article surfaces, especially if it comprises aluminum silicate, and contributes to the protection of the article from molten metal attack as well as adding strength; also, it smooths the surface to reduce mechanical keying of skulls. As stated, since the $MgSiF_6$ treatment of the invention is itself most effective (in inhibiting molten metal attack) when applied to aluminum silicate, one important field of application of the embodiments of the invention employing an aluminum silicate coating is to treat protectively formed articles constituted of refractories other than aluminum silicate. The surface-smoothing effect of the coating also renders these embodiments of the invention advantageously applicable to any formed refractory articles having rough or highly porous surfaces, including articles constituted of aluminum silicate.

If desired, a multilayer coating can be built up on a formed refractory article surface by repeating the procedure just described, i.e. with alternating successive applications of magnesium fluosilicate solution and silicate coating, and with thorough drying after each application; each application of the magnesium fluosilicate solution to a previously applied silicate coating layer is preferably at a relatively light level as noted above, e.g. 10–20 cc/100 cm² of area for a solution at 200 g/l concentration. Also, a refractory article previously treated and/or coated by the method of the invention may be retreated or recoated by the same method after a period of service, provided that its surfaces are first cleaned to remove deposits and residue.

In still further embodiments of the invention, the aluminum silicate compositions exemplified in the foregoing table, and made up into thin water slurries with colloidal silica binders to provide the abovedescribed coating layer or layers, may be employed as putties for patching, filling or bonding purposes or even for casting, by appropriately reducing the amount of binder used. For instance, the "Example" powder mixture of the table, mixed with small amounts of the aforementioned initial colloidal silica dispersion (either undiluted or diluted up to 50% with water) to a putty consistency, forms when dried a hard nonwetting, nonreactive, nonshrinking body that adheres strongly to (and is compatible with) steel, various bricks, alumina and silica castables, and all refractory boards of either aluminum silicate- or calcium silicate-based compositions when heated up to 800° C. An illustrative putty composition of this type contains 10 parts of the "Example" powder mixture to 1.8–2.2 parts of 50/50 water diluted colloidal silica dispersion. Such materials can be applied directly to steel, and used to fill cracks or form patches, or to bond refractory articles together. The method of the invention in this aspect includes the steps of forming, solidifying, and drying a patch, filler, bonding joint, or other body of the aluminum silicate putty (which thereby constitutes a formed refractory article), impregnating the exposed surfaces of the body with an aqueous $MgSiF_6 \cdot 6H_2O$ solution, and heating (either before, or incident to, service in contact with molten metal) to decompose the $MgSiF_6$ for in situ formation of protective fluoride values, again with the result of imparting to the treated patch or other body superior resistance to attack by molten aluminum.

In another exemplary embodiment of the invention, an aluminum silicate composition similar to the putty just described, but preferably at a consistency suitable for application with a paint brush or the like, is applied directly to an iron or steel surface to form thereon a protective coating layer. This layer, when dried, itself constitutes a formed refractory article, and is impregnated with an aqueous $MgSiF_6 \cdot 6H_2O$ solution (by application of the solution to the dried coating layer surface), followed by heating to decompose the MgSiF$_6$ for in situ formation of protective fluoride values.

By way of further illustration of the invention, reference may be made to the following specific examples:

EXAMPLE 1

Twelve diptubes, 2.5 cm. (outer diameter) ×1 cm. (inner diameter) ×12 cm. long, were fabricated from CaO·SiO$_2$ (wollastonite) board. Six of the tubes were treated by immersion in "Formulation I-A" solution (applying about 20 cc per 100 cm.$^2$ of treated surface area), while the other six tubes were left untreated. The treated tubes were then heated to 500° C. for one hour.

A group of 3 treated and 3 nontreated tubes was immersed in a melt of Al-4.5% Mg alloy at 750° C., for 48 hours. Another group of 3 treated and 3 nontreated tubes was immersed in a melt of an Al-0.5% Mg alloy containing 30 ppm Li and 50 ppm Na, at 750° C. for 48 hours.

In both instances, the nontreated tubes were covered with strongly adhering black skulls which could be removed only with great difficulty and in doing so, destroyed the surface of the tubes. In contrast, the treated tubes showed no sign of wetting, erosion, or metal attack, producing instead, thin, shiny, nonadhering skulls which could be easily removed by peeling off with fingers.

EXAMPLE 2

Four 2.5 cm. diameter ×30 cm. long rods were fabricated from wollastonite (CaO·SiO$_2$) board. Two of the rods were treated by immersing in "Formulation I-A" solution (applying about 15 cc per 100 cm.$^2$ of treated surface area), following which they were given a thermal treatment of about 1 hour at 500° C. The other two rods were left untreated.

All four rods were spun at 300 r.p.m. while immersed in a melt of Al-4.5% Mg alloy at 750° C., for 96 hours.

Similar to Example 1, the treated rods showed no wetting, erosion or metal attack, while the nontreated rods were covered with heavy, dark-grey, strongly adhering skulls.

EXAMPLE 3

Four rods about 3 cm. diameter ×. 30 cm. long were formed by tightly rolling 0.3 cm. thick "Fiberfrax" (aluminum silicate) paper treated with "Kaowool Rigidizer" (silica gel). After drying at 200° C., two of the rods were immersed in "Formulation I-A" solution for 3 minutes, dried at 200° C., and then treated at 500° C. for 1 hour. The other two rods were not treated.

All four rods were subjected to an immersed spinning test under the same conditions as in Example 2, except that the spinning was continued for one week (about 170 hours), with daily changes of the molten alloy. There was no sign of chemical attack or erosion of the treated rods, whereas the nontreated rods were covered with heavy strongly-adhering, black skulls.

EXAMPLE 4

Four molten aluminum containers (about 43×30×23 cm.) manufactured from "Kaowool" (Al$_2$O$_3$·SiO$_2$). fibrous refractory ("rigidized") and used for distributing molten metal in a continuous casting operation, were tested in continuous plant service for one week, which involved a variety of low-alloy content aluminum alloys at temperatures of the order of 700° C. or less. Prior to being placed in service, two of the four containers had been given a treatment in accordance with the invention, comprising: brushing on "Formulation I" solution in an amount of 15–20 cc/100 cm.$^2$ of treated surface area; drying overnight at about 200° C.; brushing on an aluminum silicate coating formulation as described above ("Formulation VI") for soft porous boards to produce a thin, smooth layer; drying overnight at about 200° C.; brushing on "Formulation I" solution (15–20 cc/100 cm.$^2$); drying at 200° C., then heating to 500° C. for 1 hour. The other two containers had been left untreated.

The two nontreated containers developed heavy pitting and surface alteration after only 48 hours of service, while the treated containers remained in "asnew" condition after 100 hours of continuous service.

EXAMPLE 5

Four cylinders, 21.6 cm. (internal diameter) ×1.9 cm. thick wall ×45.7 cm. long, were constructed from pre-softened 0.3 cm. thick "Fiberfrax paper" (Al$_2$O$_3$·SiO$_2$ fiber) and colloidal silica rigidizer. Two of the cylinders were treated by brushing on "Formulation I-A" solution in an amount of 20 cc/100 cm.$^2$, while the other two cylinders were left untreated. One end of each cylinder was blocked off and, in a vertical position, they were filled with molten Al-4.5% Mg alloy and held in a furnace at 750° C. for 72 hours.

After removal from the furnace and emptying, the nontreated cylinders were found to have been heavily attacked by the alloy, leaving their surfaces hard and brittle with strongly-adhering dark-grey skulls which could be removed only by means of a hammer and chisel. X-ray diffraction analysis of the altered grey-black surface material showed it to contain mainly α-Al$_2$O$_3$ and Si metal, evidently originating from the following reducing reactions by the Al and Mg in the alloy:

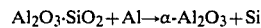

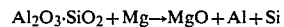

The treated cylinders showed no chemical attack by the alloy and their thin, light-colored skulls were easily peeled off by hand.

EXAMPLE 6

A large molten aluminum holding vessel, 1.52 m. deep × 2.44 m. diameter, made of a high-alumina castable refractory had been badly attacked by the metal to form hard, dark-grey mixed α-Al$_2$O$_3$+Si material which tended to excessively crack and spall in many places. After suitable patching, the internal walls of the vessel were covered with a double layer of 0.3 cm. thick Fiberfrax paper, rigidized with colloidal silica. After drying at room temperature for two days, "Formulation I-A" solution in an amount of about 15 cc/100 cm.$^2$ of treated surface area was brushed onto the lining; then the surface was heated (by electric heating elements) to 300° C. for 2 days.

The vessel was put into continuous operation for two months, during which time a variety of aluminum alloys were processed through the vessel, including Al-4.5% Mg alloy. On examination after dumping the contents and cooling, following the above operating period, the liner remained by and large intact, having completely protected the walls of the vessel from attack by the metal.

EXAMPLE 7

Three 30 cm. ×30 cm. ×3 cm. tiles were cast from high-alumina refractory (+80% $Al_2O_3$) and dried/calcined at 800° C. One tile was left untreated, and another was dipped into standard "Formulation I-A" solution for three minutes. The third tile was given a "Formulation I"/aluminum silicate coating/"Formulation I" treatment similar to that described in Example 4, except that the coating formula ("Formulation V") was chosen as suitable for material of brick density and the thickness of coating applied was of the order of 1/32–1/16". All three tiles were then suspended in Al-4.5% Mg alloy at 750° C., for 96 hours.

On examination of the tiles, it was found that the nontreated tile had been heavily attacked by the alloy, the tile treated with "Formulation I-A" solution had developed several localized alternations (dark brown patches) at somewhere between 72 and 96 hours of immersion, while there was no noticeable attack on the tile that had been given the full "Formulation I"/silicate coating/"Formulation I" treatment.

EXAMPLE 8

Three tiles were made, treated, and tested as in Example 7, except that they were made from ground fused silica castable refractory. Both the "Formulation I-A" treatment and the full treatment including silicate coating gave satisfactory protection against the molten alloy, while the nontreated tile was heavily altered and was covered with a strongly adhering skull which was practically impossible to remove, even with chisel and hammer.

EXAMPLE 9

A 10 mm. wide ×35 mm. long ×10 mm. deep cavity was machined into one 15 mm ×40 mm face of each of several 15×40×40 mm steel blocks and then the cavities filled with a formulation of aluminum silicate powder mixture (the "Example" mixture of the above table) with colloidal silica binder that differed from "Formulation V" only in that it was made to the consistency of putty by using 20 parts of 50/50 waterdiluted silica gel binder in the formulation, instead of the normal 60 cc of 50/50 silica gel per 100 grams of powder of the standard "Formulation V." After filling the cavity, the filled blocks were treated at 300° C., followed later by applying "Formulation I-A" solution to the face of the aluminum silicate filler material.

The blocks were then subjected to cycles of alternate exposure to molten aluminum followed by removal from contact with aluminum, which meant alternate heating and cooling of the blocks. After more than 15 hours of such cycling, the aluminum silicate fillings in the blocks showed no deterioration whatsoever, including no tendency to crack or to separate from intimate contact with the steel surface of the cavity.

EXAMPLE 10

500 g. of $MgSiF_6 \cdot 6H_2O$ crystals are added to 1.5 liters of hot tap water with vigorous stirring which is continued for 10–20 minutes until all the crystals have been dissolved. While stirring is proceeding, 200 ml of the standard "Dispural" colloidal alumina suspension are added, and stirring is continued for about another 20 minutes.

The tip of a delicate, highly porous caster nosepiece tile is dipped into the resultant concentrated solution/suspension. This single tip dipping is equivalent to about two dippings in a "Formulation I-A" solution of 200 g/l magnesium fluosilicate concentration, and provides a strong protective treatment (where the $MgSiF_6$ is decomposed by heating) for a restricted area, i.e. the dipped tip, without causing travel of the solution by "wicking" beyond the region of the tile desired to be treated.

EXAMPLE 11

In order to achieve a durable, non-spalling coating, two coats of relatively thick slurry based on 1 kg of the "Example" mixture of the above Table in 0.5 litre of colloidal silica binder were applied (by brush) to large cast iron impellers of about 2 ft. diam. and 4 ft. high, used in a large vessel for high-speed mixing of scrap aluminum chips with molten aluminum at about 750° C. After drying at about 200° C., the coating was treated by applying "Formulation I-A" solution to the surface in an amount of about 1 g per 100 $cm^2$ of surface area. The useful life of the coated impellers was increased to about two weeks duration in comparison with two to three days for non-protected impellers or those coated with common commercial preparations.

It is to be understood that the invention is not limited to the features and embodiments hereinabove specifically set forth, but may be carried out in other ways without departure from its spirit.

I claim:

1. A method of treating a formed refractory article for use in contact with molten aluminum metal, to protect, against attack by the molten metal, a surface portion of the article arranged for exposure to the molten metal in use, wherein said article is constructed of refractory material comprising at least one oxide selected from the class consisting of alumina, silica, aluminum silicate, and calcium silicate, said method comprising the steps of
   (a) impregnating said surface portion of the formed refractory article with an aqueous solution of magnesium fluosilicate for establishing thereon a magnesium fluosilicate deposit capable of providing, upon thermal decomposition, fluoride values of a type and in an amount effective to enhance the resistance of said surface portion to attack by molten aluminum metal; and thereafter (b) heating at least the impregnated surface portion to decompose the deposited magnesium fluosilicate thereon for producing, in situ, said fluoride values.

2. A method according to claim 1, wherein said solution is an aqueous solution of MgSiF$_6$·6H$_2$O, and wherein step (a) includes drying the impregnated surface portion of the article to remove free water of the impregnating solution.

3. A method according to claim 2, wherein step (a) further includes heating the impregnated and dried surface portion of the article for dehydrating the MgSiF$_6$·6H$_2$O of said deposit.

4. A method according to claim 1, wherein the amount of magnesium fluosilicate deposited on said surface portion in step (a), per unit area of said surface portion, is about 1.0 to about 25 grams of MgSiF$_6$·6H$_2$O per 100 cm$^2$ of surface area.

5. A method according to claim 1, wherein step (b) is performed by heating at least said surface portion of said article to a temperature of about 300° to about 500° C. before bringing said article into contact with molten metal.

6. A method according to claim 1, wherein step (b) is performed by bringing said surface portion of said article into contact with molten aluminum metal.

7. A method according to claim 1, wherein said refractory material comprises a fibrous refractory and said article is a compressed body thereof.

8. A method according to claim 1, wherein said refractory material comprises a castable refractory and said article is a cast body thereof.

9. A method according to claim 1, wherein said refractory material comprises alumina silicate.

10. A method according to claim 1, wherein step (a) includes preparing said solution by dissolving crystalline MgSiF$_6$·6H$_2$O in water.

11. A method according to claim 1, wherein step (a) includes preparing said solution by adding MgO and HF to a dilute aqueous solution of H$_2$SiF$_6$ for reaction to produce magnesium fluorosilicate.

12. A method of treating a formed refractory article for use in contact with molten aluminum metal, to protect, against attack by the molten metal, a surface portion of the article arranged for exposure to the molten metal in use, said method comprising the steps of
(a) impregnating said surface portion of the formed refractory article with an aqueous solution of magnesium fluosilicate for establishing thereon a magnesium fluosilicate deposit capable of providing, upon thermal decomposition, fluoride values of a type and in an amount effective to enhance the resistance of said surface portion to attack by molten aluminum metal and thereafter
(b) heating at least the impregnated surface portion to decompose the deposited magnesium fluosilicate thereon for producing, in situ, said fluoride values;
(c) said impregnating step including incorporating in said solution an aqueous dispersion of colloidal alumina before impregnating said surface portion with the solution, for depositing colloidal alumina on said surface portion.

13. A method according to claim 12, wherein said surface portion is porous, and wherein the dispersion of colloidal alumina is incorporated in said solution a proportion effective to reduce the porosity of said surface portion by at least partially filling pores thereof with deposited colloidal alumina.

14. A method according to claim 12, wherein the incorporating step comprises mixing, with a major proportion of an aqueous solution of magnesium fluosilicate, a minor proportion of said colloidal dispersion, and wherein said colloidal dispersion contains about 5% to about 10% solids.

15. A method according to claim 1, further including the steps of
(c) applying to the impregnated surface portion, after performance of step (a), a layer of a coating comprising a silicate selected from the class consisting of aluminum silicate and calcium silicate in mixture with a binder, and, (d) after said layer is dry, impregnating said layer with an aqueous solution of magnesium fluosilicate.

16. A method according to claim 15, wherein steps (c) and (d) are performed before step (b).

17. A method according to claim 15, further including the step of calcining said layer.

18. A method according to claim 15, wherein said silicate is aluminum silicate.

19. A method according to claim 15, wherein said aluminum silicate is in the form of minute needles produced by milling fibrous fused aluminum silicate.

20. A method according to claim 15, wherein said coating consists essentially of
(i) a powder mixture comprising a major porportion of said silicate and a minor proportion of kaolin, and
(ii) a binder.

21. A method according to claim 20, wherein said binder is a dispersion of colloidal silica.

22. A method according to claim 20, wherein said powder mixture further includes a minor proportion of at least one ingredient, in powder form, selected from the class consisting of α-Al$_2$O$_3$ and BaSO$_4$.

23. A method according to claim 20, wherein said powder mixture further includes a minor proportion of α-Al$_2$O$_3$ powder and a minor proportion of BaSO$_4$ powder.

24. A method according to claim 20, wherein said silicate is a finely divided fibrous fused aluminum silicate.

25. A method according to claim 20, wherein said powder mixture consists essentially of 600–900 parts of finely divided fibrous fused aluminum silicate, 30–90 parts of kaolin, 0–200 parts of α-Al$_2$O$_3$ powder, and 0–100 parts of BaSO$_4$ powder; and wherein said binder is a dispersion of colloidal silica.

26. A method according to claim 25, wherein step (d) is performed by applying to said layer a quantity of said solution for depositing on said layer an amount of magnesium fluosilicate equal to that deposited by applying to said layer about 10 to about 20 cc per 100 cm$^2$ of surface area of an aqueous solution of MgSiF$_6$·6H$_2$O at a concentration of 200 grams per liter.

27. A method of treating a formed refractory article for use in contact with molten aluminum metal, to protect, against attack by the molten metal, a surface portion of the article arranged for exposure to the molten metal in use, wherein said formed refractory article is a dried body of a refractory composition consisting essentially of (i) a powder mixture comprising a major proportion of a silicate selected from the class consisting of aluminum silicate and calcium silicate and a minor proportion of kaolin, and (ii) a binder, said method comprising the steps of (a) impregnating said surface portion of the formed refractory article with an aqueous solution of magnesium fluosilicate for establishing thereon a magnesium fluosilicate deposit capable of providing upon thermal decomposition fluoride values of a type and in an amount effective to enhance the resistance of said surface portion to attack by molten aluminum metal; and thereafter (b) heating at least the impregnated surface portion to decompose the deposited magnesium fluosilicate thereon to producing, in situ, said fluoride values.

28. An article produced by the method of claim 1.
29. An article produced by the method of claim 12.
30. An article produced by the method of claim 16.
31. An article produced by the method of claim 28.
32. A method of protecting a formed refractory article from attack by molten aluminum metal comprising depositing magnesium fluosilicate on a surface portion of the formed article exposed for contact with molten metal and heating at least said surface portion for decomposing the deposited magnesium fluosilicate to produce, in situ, fluoride values effective to enhance the resistance of said surface portion to attack by molten aluminum metal, wherein said article is constituted of refractory material comprising at least one oxide selected from the class consisting of alumina, silica, aluminum silicate, and calcium silicate.

33. A method according to claim 32, wherein the depositing step includes depositing colloidal alumina together with magnesium fluosilicate on said surface portion.

34. A method according to claim 32, further including the steps of applying to said surface portion, after the depositing step, a layer of an initially fluent coating comprising a silicate selected from the class consisting of aluminum silicate and calcium silicate, and, after the coating layer has dried, depositing magnesium fluosilicate thereon.

35. A method according to claim 22, wherein said one ingredient is finely-divided alpha-$Al_2O_3$.

* * * * *